United States Patent
Hashimoto

(10) Patent No.: US 10,741,831 B2
(45) Date of Patent: Aug. 11, 2020

(54) METHOD FOR PRODUCING POSITIVE ELECTRODE FOR NONAQUEOUS ELECTROLYTE SECONDARY BATTERIES AND METHOD FOR PRODUCING NONAQUEOUS ELECTROLYTE SECONDARY BATTERY

(71) Applicant: SANYO Electric Co., Ltd., Daito-shi, Osaka (JP)

(72) Inventor: Kazuya Hashimoto, Osaka (JP)

(73) Assignee: SANYO Electric Co., Ltd., Daito-shi, Osaka (JP)

( * ) Notice: Subject to any disclaimer, the term of this patent is extended or adjusted under 35 U.S.C. 154(b) by 13 days.

(21) Appl. No.: 16/257,751

(22) Filed: Jan. 25, 2019

(65) Prior Publication Data
US 2019/0305300 A1   Oct. 3, 2019

(30) Foreign Application Priority Data
Mar. 29, 2018   (JP) .................. 2018-063497

(51) Int. Cl.
| | |
|---|---|
| *H01M 4/36* | (2006.01) |
| *H01M 4/131* | (2010.01) |
| *H01M 4/133* | (2010.01) |
| *H01M 4/1393* | (2010.01) |
| *H01M 4/04* | (2006.01) |
| *H01M 10/0587* | (2010.01) |
| *H01M 4/1391* | (2010.01) |
| *H01M 4/02* | (2006.01) |

(52) U.S. Cl.
CPC ........... *H01M 4/364* (2013.01); *H01M 4/043* (2013.01); *H01M 4/131* (2013.01); *H01M 4/133* (2013.01); *H01M 4/1391* (2013.01); *H01M 4/1393* (2013.01); *H01M 10/0587* (2013.01); *H01M 2004/021* (2013.01)

(58) Field of Classification Search
CPC ...... H01M 4/043; H01M 4/131; H01M 4/133; H01M 4/1391; H01M 4/1393; H01M 4/364
USPC ........................................................ 429/209
See application file for complete search history.

(56) References Cited

U.S. PATENT DOCUMENTS

| | | | |
|---|---|---|---|
| 2012/0282525 A1 | 11/2012 | Nagai et al. | |
| 2013/0011331 A1 | 1/2013 | Nagai et al. | |
| 2013/0302687 A1 | 11/2013 | Nagai et al. | |
| 2015/0072232 A1 | 3/2015 | Nagai | |

(Continued)

FOREIGN PATENT DOCUMENTS

| | | |
|---|---|---|
| JP | 2011-119092 A | 6/2011 |
| JP | 5904382 B2 | 4/2016 |

*Primary Examiner* — James M Erwin
(74) *Attorney, Agent, or Firm* — Westerman, Hattori, Daniels & Adrian, LLP

(57) ABSTRACT

A method for producing a positive electrode for a nonaqueous electrolyte secondary battery includes forming a positive electrode mixture layer on a positive electrode core, the positive electrode mixture layer containing hollow positive electrode active material particles having a BET specific surface area X of 1.5 m²/g or more; and compressing the positive electrode mixture layer. The ratio of the BET specific surface area Y of the positive electrode active material particles after the compression to the BET specific surface area X (Y/X) is between 1.05 and 1.35.

3 Claims, 3 Drawing Sheets

(56) References Cited

U.S. PATENT DOCUMENTS

2016/0268596 A1* 9/2016 Uchiyama ........... C23C 18/1216
2017/0084913 A1* 3/2017 Misaki ................ H01M 4/0471

* cited by examiner

METHOD FOR PRODUCING POSITIVE ELECTRODE FOR NONAQUEOUS ELECTROLYTE SECONDARY BATTERIES AND METHOD FOR PRODUCING NONAQUEOUS ELECTROLYTE SECONDARY BATTERY

CROSS REFERENCE TO RELATED APPLICATIONS

The present invention application claims priority to Japanese Patent Application No. 2018-063497 filed in the Japan Patent Office on Mar. 29, 2018, the entire contents of which are incorporated herein by reference.

BACKGROUND OF THE INVENTION

Field of the Invention

The present disclosure relates to a method for producing a positive electrode for nonaqueous electrolyte secondary batteries and a method for producing a nonaqueous electrolyte secondary battery.

Description of Related Art

The output power of a battery can be improved by the use of hollow positive electrode active material particles. For example, Japanese Patent No. 5904382 (Patent Document 1) discloses a nonaqueous electrolyte secondary battery that uses hollow positive electrode active material particles. The shell of the hollow particles is a layer of a lithium transition metal oxide, and there is a space inside the shell.

According to Patent Document 1, this battery maintains high output power at low temperatures and can be stored at high temperatures with little degradation in capacity.

BRIEF SUMMARY OF THE INVENTION

For nonaqueous electrolyte secondary batteries, however, the use of hollow particles as a positive electrode active material brings the disadvantage of increased resistance and reduced capacity after repeated charge and discharge. An object of the present disclosure is to provide a nonaqueous electrolyte secondary battery superior in output power and less prone to reduced capacity due to increased resistance.

According to an aspect of the present disclosure, a method for producing a positive electrode for a nonaqueous electrolyte secondary battery includes forming a positive electrode mixture layer on a positive electrode core, the positive electrode mixture layer containing hollow positive electrode active material particles having a Brunauer-Emmett-Teller (BET) specific surface area X of 1.5 m$^2$/g or more; and compressing the positive electrode mixture layer. The ratio of the BET specific surface area Y of the positive electrode active material particles after the compression to the BET specific surface area X (Y/X) is between 1.05 and 1.35.

DETAILED DESCRIPTION OF THE INVENTION

The output power of a nonaqueous electrolyte secondary battery is higher with hollow active material particles (hereinafter also hollow particles) for the positive electrode than with the commonly used solid active material particles (hereinafter also solid particles). Research by the inventors, however, has found that hollow particles are more prone than solid particles to elastic deformation (springing back), and this quality of hollow particles affects the electrical conductivity of a positive electrode mixture layer containing them.

Figure 3A:
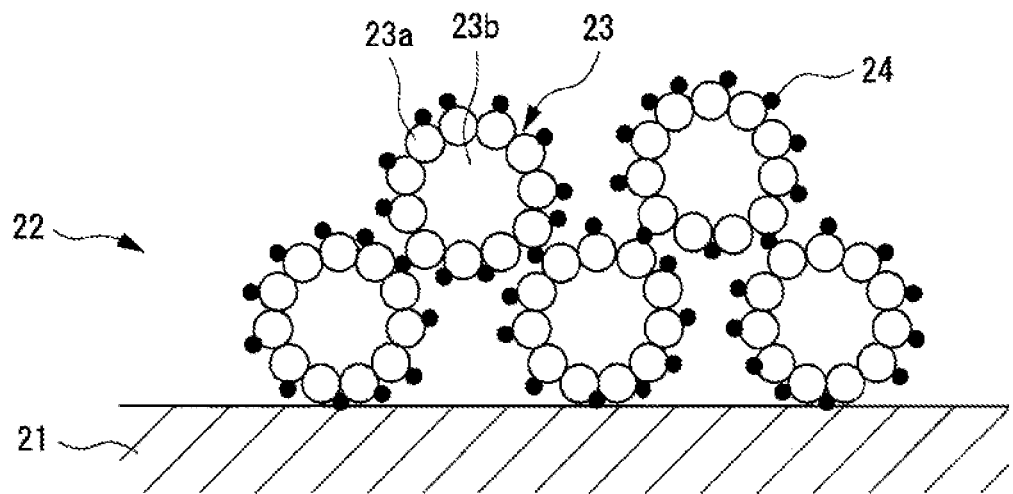
FIGS. 3A and 3B show cross-sectional views of a positive electrode as an example of an embodiment.
Figure 3B:
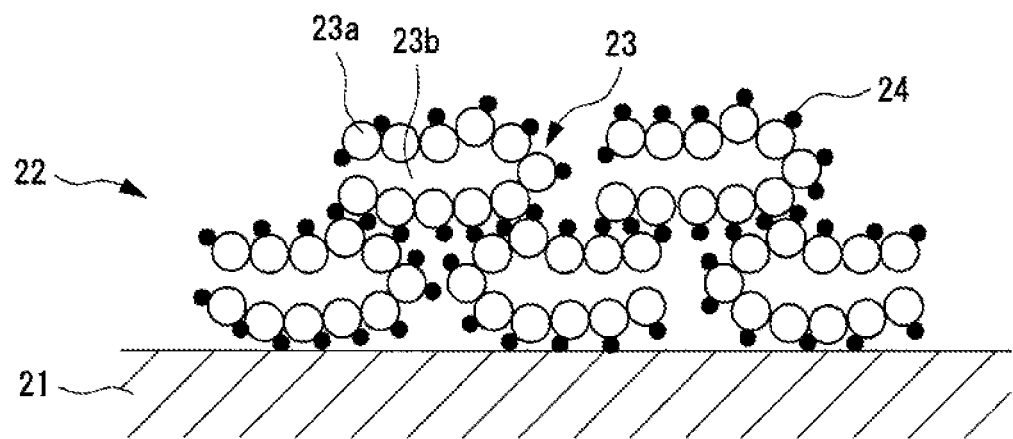
Figure 4A:
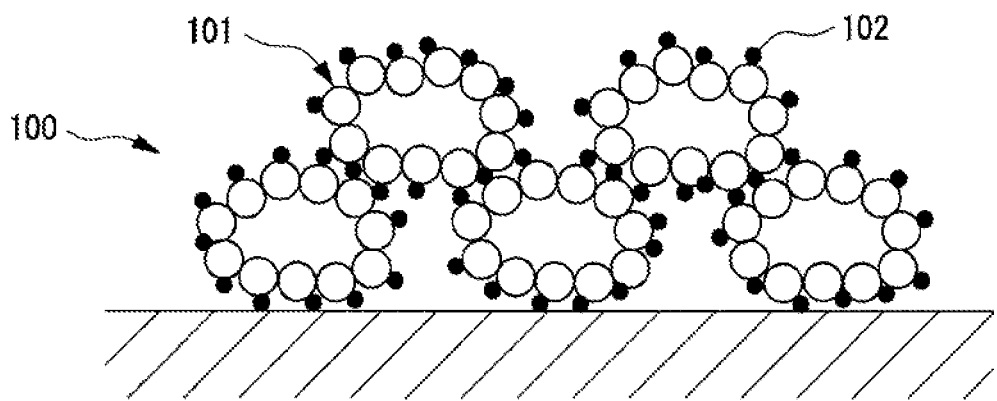
FIGS. 4A and 4B show cross-sectional views of a known positive electrode.
Figure 4B:
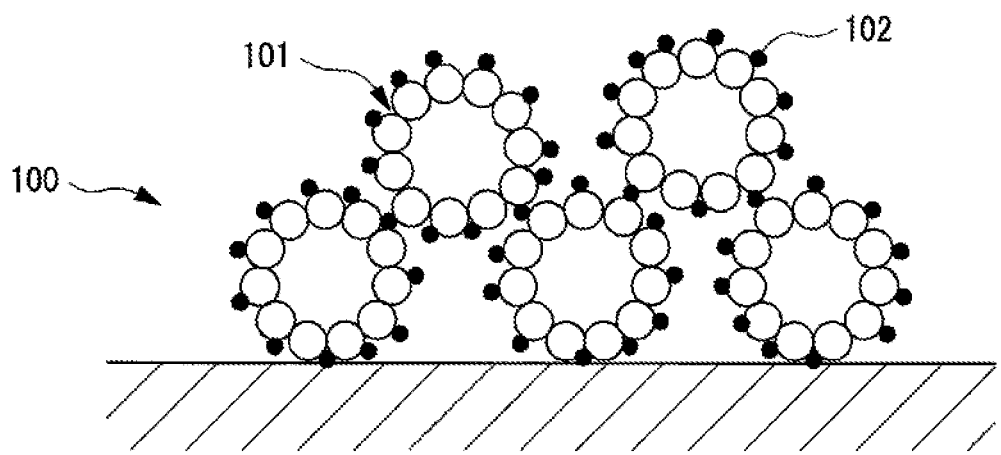

FIGS. 4A and 4B are cross-sectional views of a known positive electrode. In FIG. 4A, the positive electrode mixture layer 100 has just been compressed, and in FIG. 4B, the hollow particles 101, which are the positive electrode active material, have sprung back after the compression of the positive electrode mixture layer 100. As illustrated in FIGS. 4A and 4B, hollow particles 101 compressed into oblate spheres spring back into near-spheres, for example over time or after charge and discharge. This means that even if compression creates good conductive paths inside the positive electrode mixture layer 100, a morphological change of the hollow particles 101 affects the integrity of these conductive paths in the positive electrode mixture layer 100. Specifically, the morphological change results in fewer points of contact between, for example, particles of the conductor 102, the conductor 102 and the hollow particles 101, and the conductor 102 and the positive electrode core. The resulting increased resistance leads to a decrease in capacity. It should be noted that FIGS. 4A and 4B (and FIGS. 3A and 3B) are schematic diagrams. The illustrated bellow particles 101 and particles of the conductor 102 may be different in size and number from those in actual batteries.

The inventors successfully controlled this springing back of hollow particles by using hollow particles having a Brunauer-Emmett-Teller (BET) specific surface area X of 1.5 m$^2$/g or more and performing compression until a relative BET specific surface area Y of the hollow particles (Y/X) between 1.05 and 1.35. This reduced the increase in resistance during charge and discharge cycles without compromising high output power. In this production process, the hollow particles are compressed to a partial break. A partial break of the hollow particles limits the springing back of the particles, reducing the associated loss of the electrical conductivity of the positive electrode mixture layer. Although breaking the hollow particles by compression increases their BET specific surface area, compressing them until a Y/X between 1.05 and 1.35 ensures that the particles are broken but only to the extent that the shape of the space inside is preserved. In this way, the springing back as a cause of increased resistance can be controlled without compromising high output power.

The following describes an example of an embodiment of the present disclosure in detail with reference to the drawings. It is to be understood that the present disclosure is not limited to the following embodiment.

An example of an embodiment of the present disclosure is a method for producing a nonaqueous electrolyte secondary battery. As an example of a nonaqueous electrolyte secondary battery produced by this method, a laminated battery, which has a sheath 11 formed by laminated sheets 11a, 11b (nonaqueous electrolyte secondary battery 10), is described. The nonaqueous electrolyte secondary batteries according to an aspect of the present disclosure, however, are not limited in shape. They may be, for example, cylindrical batteries, which have a cylindrical case for the cell, or square batteries, which have a square case for the cell.

Figure 1:
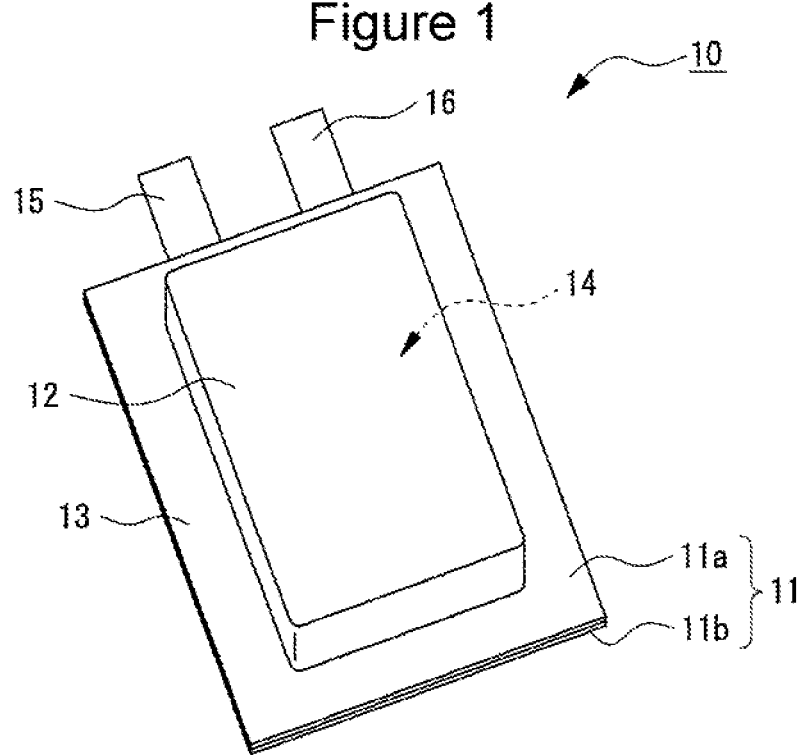
FIG. 1 shows a perspective view of a nonaqueous electrolyte secondary battery as an example of an embodiment.

FIG. 1 is a perspective view of the nonaqueous electrolyte secondary battery 10. The nonaqueous electrolyte secondary battery 10 includes an electrode element 14 and a nonaqueous electrolyte, both of which are contained in the housing section 12 of the sheath 11. The laminated sheets 11a, 11b are multilayer sheets in which metal and resin layers are stacked. For example, the laminated sheets 11a, 11b may have two resin layers with a metal layer interposed therebetween, with one of the resin layers made of a heat-bondable resin. The metal layer can be, for example, an aluminum layer.

The nonaqueous electrolyte contains a nonaqueous solvent and an electrolyte salt dissolved in the nonaqueous electrolyte. The nonaqueous solvent can be selected from, for example, esters, ethers, nitriles, and amides or may even be a mixture of two or more of these. The nonaqueous solvent, moreover, may contain its halogenated derivative, which has a halogen atom, such as a fluorine atom, in place of at least a subset of the hydrogens in the solvent. The nonaqueous electrolyte does not need to be a liquid electrolyte but may be a solid electrolyte, such as a gel-polymer electrolyte. The electrolyte salt is a lithium salt, such as $LiPF_6$.

The sheath 11 is, for example, substantially rectangular in plan view. The sheath 11 has a sealing section 13 formed by joining the laminated sheets 11a, 11b together, and this sealing section 13 seals the housing section 12, in which the electrode element 14 is housed. The sealing section 13 extends along the edges of the sheath 11 with a substantially constant width is like a picture frame, and the portion that is surrounded by the sealing section 13 and is substantially rectangular in plan view is the housing section 12. The housing section 12 is formed by creating, in at least one of the laminated sheets 11a, 11b, a depression that can accommodate the electrode element 14. In this embodiment, the depression is in the laminated sheet 11a.

The nonaqueous electrolyte secondary battery 10 also has a pair of electrode leads (positive electrode lead 15 and negative electrode lead 16) connected to the electrode element 14. Each electrode lead extends from the inside of the sheath 11 to the outside. In the illustration in FIG. 1, the electrode leads extend from the same edge of the sheath 11 and nm substantially parallel to each other. The positive and negative electrode leads 15, 16 are both thin electrically conductive plates. For example, the positive electrode lead 15 is a thin plate of an aluminum-based metal, and the negative electrode lead 16 is a thin plate of a copper- or nickel-based metal.

Figure 2:
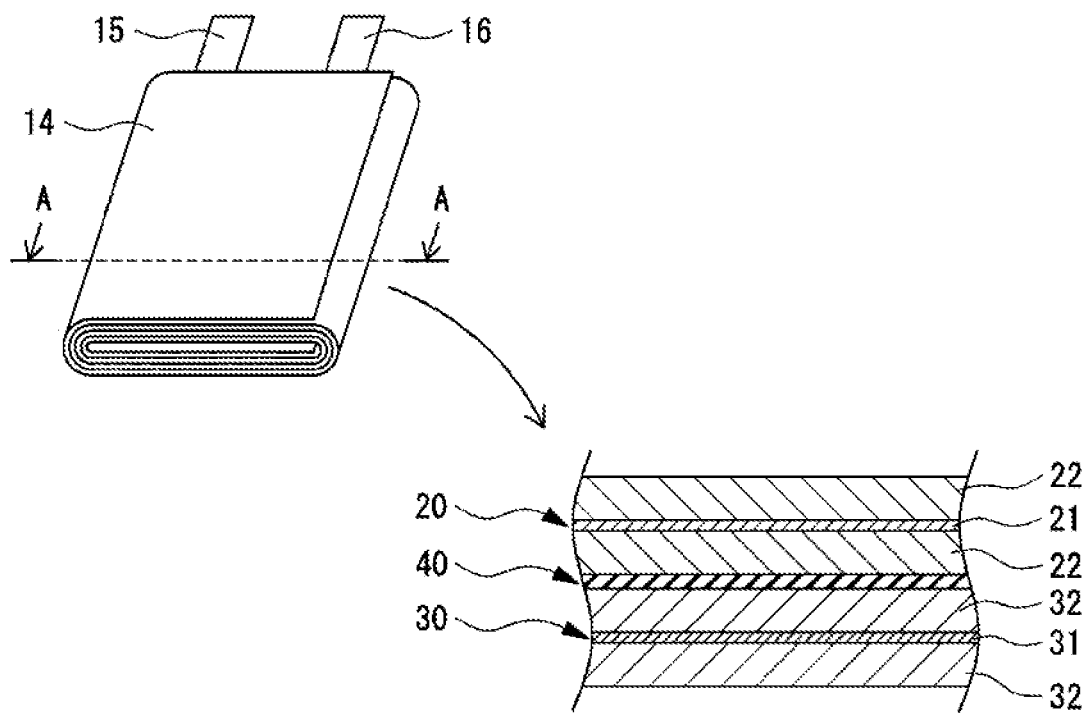
FIG. 2 shows perspective and cross-sectional diagrams illustrating an electrode element as an example of an embodiment.

FIG. 2 is partial perspective and cross-sectional (line A-A) views of the electrode element 14. As illustrated in FIG. 2, the electrode element 14 has a strip-shaped positive electrode 20, a strip-shaped negative electrode 30, and a separator 40 interposed between the positive electrode 20 and negative electrode 30. The positive and negative electrodes 20, 30 are wound with the separator 40 therebetween, forming the electrode element 14. The negative electrode 30 is somewhat larger in size than the positive electrode 20 to prevent the separation of lithium. A multilayer electrode element, formed by multiple positive electrodes and multiple negative electrodes stacked with separators therebetween, may also be used.

The following describes the components of the electrode element 14 in further detail with reference to FIGS. 2, 3A, and 3B, with a particular focus on the structure and production of the positive electrode 20. FIGS. 3A and 3B are cross-sectional views of the positive electrode 20. FIG. 3A illustrates a positive electrode mixture layer 22 before compression, and FIG. 3B the positive electrode mixture layer 22 after compression.

Positive Electrode

As illustrated in FIGS. 2, 3A, and 3B, the positive electrode 20 has a positive electrode core 21 and a positive electrode mixture layer 22 on the positive electrode core 21. The positive electrode core 21 can be, for example, a foil of a metal that is stable within the range of potentials of the positive electrode 20, such as aluminum or an aluminum alloy, or a film with a layer of such a metal on its surface. The positive electrode mixture layer 22 contains positive electrode active material particles 23, a conductor 24, and a binder (not illustrated) and preferably extends on both sides of the positive electrode core 21.

The positive electrode 20 is produced through formation and compression. In the formation, a positive electrode mixture layer 22 containing hollow positive electrode active material particles 23 having a BET specific surface area X of 1.5 $m^2$/g or more (hereinafter also hollow particles 23) is formed on a positive electrode core 21. In the compression, the active material mixture layer 22 is compressed. Admittedly, the use of hollow particles 23 will improve the output power of the battery by reducing resistance, but simply using hollow particles 23 will result in increased resistance. The particles spring back, and the resulting fewer points of contact, for example between particles of the conductor 24, translate into only an insufficient number of conductive paths being formed (see FIGS. 4A and 4B).

In this production process, the hollow particles 23 are compressed until they break to a certain extent. This limits their springing back, thereby limiting the increase in resistance that will occur during charge and discharge cycles. Specifically, the hollow particles 23 are compressed to the extent that the ratio of the BET specific surface area Y of the hollow particles 23 after compression to the BET specific surface area X of the hollow particles 23 before compression (Y/X) is between 1.05 and 1.35. By adjusting the Y/X to this range, the springing back as a cause of increased resistance can be controlled without compromising high output power. Preferably, the broken hollow particles 23 have an opening at an end in the direction parallel to the positive electrode core 21 as illustrated in FIG. 3B. The positive electrode mixture layer 22 may contain solid positive electrode active material particles (solid particles) unless this embodiment of the present disclosure fails in its object.

Here, the term hollow particles 23 refers to particles that have a space 23b inside in which the active material is absent or sparse. The hollow particles 23 have a shell surrounding the space 23b. Preferably, the shell of the hollow particles 23 is an aggregate of multiple primary particles 23a. There may be primary particles 23a in the space 23b, but the density of primary particles 23a is lower in the space 23b than in the shell. The term solid particles refers to particles whose inside is also densely packed with the active material. The density of the active material is substantially equal between the inner and outer portions of the particles.

The positive electrode 20 can be prepared by, for example, coating a positive electrode core 21 with a positive electrode mixture shiny that contains materials including hollow particles 23, a conductor 24, and a binder, drying the coating, and compressing the dried coating to form a positive electrode mixture layer 22 on both sides of the positive electrode core 21. The hollow particles 23 in the positive electrode mixture slurry has a BET specific surface area X of 1.5 m²/g or more, preferably between 1.5 and 3.1 m²/g. If the BET specific surface area X of the hollow particles 23 before compression is less than 1.5 m²/g, the output power of the battery may be lower than intended. The volume median diameter (D50) of the hollow particles 23 is, for example, between 2 and 30 µm, preferably between 2 and 10 µm. The D50 of the hollow particles 23 is measured using a laser diffraction/scattering particle size distribution analyzer.

As mentioned, above, the hollow particles 23 are hollow secondary particles formed by the aggregation of primary particles 23a. The average diameter of the primary particles 23a is, for example, between 50 nm and 3 µm, preferably between 100 nm and 1 µm, and is determined by randomly selecting 100 primary particles 23a observed under a scanning electron microscope (SEM) and averaging the diameter, defined as the mean length of the major and minor axes, of the 100 particles. The volume of the space 23b is preferably between 10% and 90%, more preferably between 15% and 60%, of the total volume of the hollow particle 23 (including the volume of the space 23b) and is determined by SEM imaging.

The primary particles 23a forming the hollow particles 23 are primarily a lithium-metal composite oxide, for example a composite oxide represented by the general formula $Li_xMe_yO_z$ ($0.8 \leq x \leq 1.2$, $0.7 \leq y \leq 1.3$). In the formula, Me denotes a metal or metals that include at least one of Ni, Co, and Mn. A group of preferred lithium-metal composite oxides are composite oxides containing at least one of Ni. Co, and Mn, for example lithium-metal composite oxides containing Ni. Co, and Mn and lithium-metal composite oxides containing Ni, Co, and Al. On the surface of the particles of the lithium-metal composite oxide, there may be, for example, inorganic particles fastened to the surface, such as particles of tungsten oxide, aluminum oxide, or a lanthanoid-containing compound.

The elements contained in the lithium-metal composite oxide are not limited to Ni, Co, and Mn and may include others. Examples of such extra elements include alkali metals other than Li, transition metals other than Mn, Ni, and Co, alkaline earth metals, and group 12, 13, and 14 elements, specifically Al, B, Na, K, Ba, Ca, Mg, Ti, V, Cr, Fe, Cu, Zn, Ga, Sr, Zr, Nb, In, Sn, Ta, W, etc. In general, Zr stabilizes the crystal structure of the lithium-metal composite oxide, thereby improving the high-temperature durability and cycling properties of the positive electrode mixture layer 22.

For the conductor 24 in the positive electrode mixture layer 22, examples include carbon materials, such as carbon black, acetylene black, Ketjenblack, and graphite. The conductor 24 is preferably smaller in particle diameter than the hollow particles 23 and preferably has a D50 of, for example, 1 nm to 10 nm. The conductor 24 content of the positive electrode mixture layer 22 is preferably between 0.5% and 5% by mass, more preferably between 1% and 3% by mass, based on the total mass of the positive electrode mixture layer 22.

For the binder in the positive electrode mixture layer 22, examples include fluoropolymers, such as polytetrafluoroethylene (PTFE) and polyvinylidene fluoride (PVdF), polyacrylonitrile (PAN), polyimide resins, acrylic resins, and polyolefin resins. Combinations of these resins with, for example, a cellulose derivative, such as carboxymethyl cellulose (CMC) or its salt, or with polyethylene oxide (PEO) may also be used. The binder content of the positive electrode mixture layer 22 is preferably between 1% and 7% by mass, more preferably 2% and 4% by mass, based on the total mass of the positive electrode mixture layer 22.

As mentioned above, the positive electrode mixture layer 22 is compressed to the extent that the ratio between the BET specific surface areas of the hollow particles 23 before and after compression (Y/X) is between 1.05 and 1.35. If the Y/X is smaller than 1.05, the springing back of the hollow particles 23 is not controlled, and the resistance increases during charge and discharge cycles. If the Y/X is greater than 1.35, the hollow particles 23 are overbroken and no longer retain their hollow structure. In this case, the advantage of improved output power afforded by the use of the hollow particles 23 is lost.

The method for compressing the positive electrode mixture layer 22 is not critical, but preferably through the use of a pair of rollers sandwiching the positive electrode 20. The compressive force on the positive electrode mixture layer 22 can be controlled by changing at least one of the rolling load and the gap between the rollers. The compressive force acting on the positive electrode mixture layer 22 increases, and therefore the hollow particles 23 more easily break, with greater rolling load or narrower gap between the rollers, and the BET specific surface area Y of the hollow particles 23 after compression increases with increasing compressive force on the positive electrode mixture layer 22. In this process of compression, the compressive force on the positive electrode mixture layer 22 is controlled to make the Y/X within the range of 1.05 to 1.35.

It should be noted that the positive electrode mixture layer 22 may contain intact hollow particles 23 and/or smashed hollow particles 23. In this production process, it is preferred to compress the positive electrode mixture layer 22 in such a manner that, for example, 40% or more, preferably 80%/o or more, or substantially all, of hollow particles 23 collected from the compressed positive electrode mixture layer 22 will be partially broken but remain hollow.

Negative Electrode

The negative electrode 30 has a negative electrode core 31 and a negative electrode mixture layer 32 on the negative electrode core 31. The negative electrode core 31 can be, for example, a foil of a metal that is stable within the range of potentials of the negative electrode 30, such as copper or a copper alloy, or a film with a layer of such a metal on its surface. The negative electrode mixture layer 32 contains a negative electrode active material and a binder, such as styrene-butadiene rubber (SBR), and preferably extends on both sides of the negative electrode core 31. The negative electrode 30 can be prepared by coating a negative electrode core 31 with a negative electrode mixture slurry that contains materials including a negative electrode active material and a binder, drying the coating, and compressing the dried coating to form a negative electrode mixture layer 32 on both sides of the negative electrode core 31.

The negative electrode mixture layer 32 preferably contains graphite as a negative electrode active material. Examples include natural graphite, such as flake, vein, and amorphous graphite, and artificial graphite, such as massive artificial graphite and graphitized mesophase carbon microbeads. Amorphous carbon may also be used. The negative electrode mixture layer 32, moreover, may contain a negative electrode active material other than graphite. Examples of negative electrode active materials other than graphite include metals that alloy with lithium, such as Si and Sn, alloys containing such a metal, and compounds containing such a metal. Silicon-containing compounds, such as silicon oxides $SiO_x$ ($0.5 \leq x \leq 1.6$), are particularly preferred.

Separator

The separator 40 is a porous sheet that has ionic permeability and insulating properties. Specific examples of porous sheets include microporous thin film, woven fabric, and nonwoven fabric. Preferred materials for the separator 40 include olefin resins, such as polyethylene and polypropylene, and cellulose. The separator 40 may be single-layer or multilayer. There may be a heat-resistant layer, for example, on the surface of the separator 40.

EXAMPLES

The following describes the present disclosure in further detail by giving examples. It is to be understood that the present disclosure is not limited to these examples.

Example 1

Preparation of a Positive Electrode

The positive electrode active material was hollow particles of the lithium-metal composite oxide $LiNi_{0.35}Co_{0.35}Mn_{0.30}O_2$ having a BET specific surface area of 1.5 m$^2$/g. These hollow positive electrode active material particles were mixed with polyvinylidene fluoride and carbon black in a mass ratio on a solids basis of 95:3:2, and the resulting mixture was slurried with an appropriate amount of N-methyl-2-pyrrolidone (NMP). The resulting positive electrode mixture slurry was applied to both sides of a piece of 15-μm thick aluminum foil as the positive electrode core, and the coating was dried. After the dried coating was compressed using rollers, the workpiece was cut to the predetermined size of the electrode. In this way, a positive electrode was prepared as a stack of a square positive electrode core and a positive electrode mixture layer on both sides of the core. The area where the positive electrode mixture layer was formed measured 10 cm×12 cm, leaving the positive electrode core partially exposed at an end of the positive electrode. Then a positive electrode lead was welded to the exposed portion of the positive electrode core.

In the process of compressing the positive electrode mixture layer, the compression conditions were adjusted so that the ratio of the BET specific surface area Y of the positive electrode active material particles after compression to the BET specific surface area X (1.5 m$^2$/g) of the positive electrode active material particles before compression (Y/X) would be 1.15.

Preparation of a Negative Electrode

Graphite, styrene-butadiene robber (SBR), and carboxymethyl cellulose (CMC) were mixed in a mass ratio on a solids basis of 98:1:1, and the resulting mixture was slurried with an appropriate amount of water. The resulting negative electrode mixture slurry was applied to both sides of a piece of 8-μm thick copper foil as the negative electrode core, and the coating was dried. After the dried coating was compressed to a packing density of 1.6 g/cm$^3$ using rollers, the workpiece was cut to the predetermined size of the electrode. In this way, a negative electrode was prepared as a stack of a square negative electrode core and a negative electrode mixture layer on both sides of the core. The area where the negative electrode mixture layer was formed measured 10.2 cm×12.2 cm, leaving the negative electrode core partially exposed at an end of the negative electrode. Then a negative electrode lead was welded to the exposed portion of the negative electrode core.

Preparation of an Electrode Element

The positive and negative electrodes were stacked with a 12-μm thick, polypropylene (PP)/polyethylene (PE)/polypropylene (PP) three-layer separator therebetween. A positive electrode lead was welded to the exposed portion of the positive electrode core, and a negative electrode lead to the exposed portion of the negative electrode core.

Preparation of a Nonaqueous Electrolyte

Ethylene carbonate (EC), ethyl methyl carbonate (EMC), and diethyl carbonate (DEC) were mixed in a volume ratio of 25:35:40 (25° C., 1 atm). In the resulting solvent mixture, $LiPF_6$, lithium bis(oxalato)borate, and lithium difluorophosphate were dissolved to a concentration of 1 mol/L, 0.1 mol/L, and 0.05 mol/L, respectively. Vinylene carbonate (VC) was then added to make the VC content 0.8% by mass based on the total mass of the resulting nonaqueous electrolyte.

Fabrication of a Nonaqueous Electrolyte Secondary Battery

The electrode element and nonaqueous electrolyte were housed in a bag-shaped laminated sheath with the negative electrode and positive electrode leads sticking out of the sheath, and the opening of the sheath was sealed.

Examples 2, 3 and Comparative Examples 1 to 4

The positive electrodes and nonaqueous electrolyte secondary batteries of Examples 2, 3, and Comparative Examples 1 to 4 were prepared or fabricated as in Example 1. The positive electrode active material particles were changed to ones having the BET specific surface area X specified in Table 1, and the positive electrode mixture layer was compressed to the BET specific surface area Y and Y/X specified in Table 1 by changing the rolling load or the gap between the rollers accordingly. In Comparative Examples 1 and 2, the positive electrode active material particles were solid, not hollow.

As stated, hollow positive electrode active material particles more easily break, and therefore the Y/X increases, with greater rolling load or narrower gap between the rollers.

The batteries of Examples and Comparative Examples were subjected to the following measurement of the BET specific surface area of the positive electrode active material particles, evaluation of initial output power (direct current internal resistance, DCIR), and evaluation of cycling properties (percentage retained capacity). The results are presented in Table 1.

Measurement of the BET Specific Surface Area of the Positive Electrode Active Material The BET specific surface areas of the positive electrode active material particles were measured using Macsorb HM model-1201. The BET specific surface area Y after compression was measured using positive electrode active material particles sampled from the battery as follows. It should be noted that this measurement assumed that the initial charge and discharge do not change the BET specific surface area Y.

Measuring the BET Specific Surface Area Y

At 25° C., the nonaqueous electrolyte secondary battery was charged at a constant current (250 mA) and then at a constant voltage (4.1 V: to 12 mA) and thereafter discharged at a constant current (250 mA). The battery was then disassembled in an argon-filled glove box, and the isolated positive electrode was washed with dimethyl carbonate (DMC) for 1 minute. The washed positive electrode was heated at 500° C. for 10 hours to remove the conductor and binder, and then the mixture (positive electrode active material) was separated from the core. After 1-minute crushing in a mortar, the BET specific surface area Y of the positive electrode active material was measured. Crushing for 45 seconds, the inventors verified beforehand, is enough for the BET specific surface area levels out, when the BET specific surface area before crushing was defined as 0% and that after 1-minute crushing as 100%, the BET specific surface area was 85% at 15 seconds of crushing, 98% at 30 seconds, 100% and 45 seconds, and 100% at 2 minutes.

Measurement of the Initial Resistance (DCIR) at Room Temperature

At 25° C., the nonaqueous electrolyte secondary battery was charged to a state of charge (SOC) of 50% and then discharged at current levels of 1 C, 2 C, 5 C, 10 C, 15 C, 20 C, 25 C, and 30 C for 10 seconds at each current level. The measured voltage of the battery in each period of discharge was plotted against current to determine the resistance during discharge.

Evaluation of Cycling Properties (Percentage Retained Capacity)

At 25° C., the nonaqueous electrolyte secondary battery was charged to a voltage of 4.1 V at a constant current of 1000 mA and then discharged to 2.5 V at a constant current of 1000 mA. After 500 cycles of this charging and discharging process, the percentage of the discharge capacity to the initial discharge capacity was calculated as the percentage retained capacity.

TABLE 1

| | Positive electrode active material | | | Battery performance | |
|---|---|---|---|---|---|
| | BET specific surface area X $m^2/g$ | BET specific surface area Y $m^2/g$ | Y/X | Initial DCIR $m\Omega$ | Percentage retained capacity % |
| Comparative Example 1 | 1.3 | 1.3 | 1.02 | 2.75 | 86 |
| Comparative Example 2 | 1.3 | 1.5 | 1.15 | 2.77 | 78 |
| Example 1 | 1.5 | 1.7 | 1.15 | 2.52 | 85 |
| Comparative Example 3 | 2.4 | 2.4 | 1.01 | 2.45 | 77 |
| Example 2 | 2.4 | 2.5 | 1.05 | 2.43 | 87 |
| Example 3 | 2.4 | 3.2 | 1.35 | 2.44 | 86 |
| Comparative Example 4 | 2.4 | 3.5 | 1.45 | 2.69 | 72 |
| Example 4 | 3.1 | 3.9 | 1.26 | 2.40 | 85 |

As shown in Table 1, the batteries of Comparative Examples 1 and 2, made using solid positive electrode active material particles, were inferior to those of Examples in output power because of a higher resistance. With solid particles, moreover, compressing the positive electrode mixture layer to a Y/X of 1.15 resulted in a marked decrease in percentage retained capacity (Comparative Example 2). The batteries of Comparative Examples 3 and 4, made using the same hollow positive electrode active material particles as in Examples 2 and 3 but with the positive electrode mixture layer compressed to a Y/X falling out of the range of 1.05 to 1.35, exhibited a very low percentage retained capacity compared with the batteries of Examples 2 and 3. A Y/X greater than 1.35 resulted in the hollow particles losing much of their shape and also a significant increase in resistance (Comparative Example 4). When the hollow particles did not break or broke only to a small extent, the resistance increased during charge and discharge cycles because of the springing back of the particles, resulting in the very low percentage retained capacity (Comparative Example 3).

By contrast, the batteries of Examples were all superior in output power and exhibited good cycling performance. In the batteries of Examples, hollow positive electrode active material particles were broken moderately as a result of compression, and this limited the springing back of the particles. As a result, these batteries had good cycling properties with little increase in resistance during charge and discharge cycles while maintaining high output power.

While detailed embodiments have been used to illustrate the present invention, to those skilled in the art, however, it will be apparent from the foregoing disclosure that various changes and modifications can be made therein without departing from the spirit and scope of the invention. Furthermore, the foregoing description of the embodiments according to the present invention is provided for illustration only, and is not intended to limit the invention.

What is claimed is:

1. A method for producing a positive electrode for a nonaqueous electrolyte secondary battery, the method comprising:
    forming a positive electrode mixture layer on a positive electrode core, the positive electrode mixture layer containing hollow positive electrode active material particles having a BET specific surface area X of 1.5 $m^2/g$ or more; and
    compressing the positive electrode mixture layer, wherein a ratio of a BET specific surface area Y of the positive electrode active material particles after the compression to the BET specific surface area X, Y/X, is between 1.05 and 1.35.

2. The method according to claim 1 for producing a positive electrode for a nonaqueous electrolyte secondary battery, wherein the BET specific surface area X is equal to or less than 3.10 $m^2/g$.

3. A method for producing a nonaqueous electrolyte secondary battery, the method comprising:
    forming a positive electrode mixture layer on a positive electrode core, the positive electrode mixture layer containing hollow positive electrode active material particles having a BET specific surface area X of 1.5 $m^2/g$ or more; and
    compressing the positive electrode mixture layer, wherein a ratio of a BET specific surface area Y of the positive electrode active material particles after the compression to the BET specific surface area X, Y/X, is between 1.05 and 1.35.

* * * * *